(12) United States Patent
Meier

(10) Patent No.: US 10,181,789 B2
(45) Date of Patent: Jan. 15, 2019

(54) SIGNAL ISOLATOR

(71) Applicant: Phoenix Contact GmbH & Co. KG, Blomberg (DE)

(72) Inventor: Heinz-Wilhelm Meier, Kalletal (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 70 days.

(21) Appl. No.: 15/112,489

(22) PCT Filed: Jan. 22, 2015

(86) PCT No.: PCT/EP2015/051216
§ 371 (c)(1),
(2) Date: Jul. 19, 2016

(87) PCT Pub. No.: WO2015/110512
PCT Pub. Date: Jul. 30, 2015

(65) Prior Publication Data
US 2016/0336853 A1 Nov. 17, 2016

(30) Foreign Application Priority Data

Jan. 22, 2014 (DE) ...................... 10 2014 100 693

(51) Int. Cl.
G05F 1/20 (2006.01)
H02M 3/156 (2006.01)
(Continued)

(52) U.S. Cl.
CPC .............. H02M 3/156 (2013.01); G01D 3/08 (2013.01); G01D 21/00 (2013.01); G05F 1/56 (2013.01);
(Continued)

(58) Field of Classification Search
CPC .................................................. G05F 1/20
(Continued)

(56) References Cited

U.S. PATENT DOCUMENTS 5,821,703 A * 10/1998 Callahan ................. H02M 1/44
315/194
5,841,643 A * 11/1998 Schenkel .......... H02M 3/33507
323/282

(Continued)

FOREIGN PATENT DOCUMENTS

CN 101485082 A 7/2009
CN 202475245 U 10/2012
(Continued)

OTHER PUBLICATIONS

"Office Action" issued in counterpart German Patent Application No. 102014100693.3, dated Nov. 27, 2014, Published in: DE.
(Continued)

*Primary Examiner* — Adolf Berhane
*Assistant Examiner* — Nusrat Quddus
(74) *Attorney, Agent, or Firm* — Kaplan Breyer Schwarz, LLP

(57) ABSTRACT

Provided is a signal isolator with reduced power loss. The signal isolating circuit comprises an input stage and an output circuit that is connected downstream thereof and which includes a linear regulator. The linear regulator comprises an operational amplifier and a switching regulator, wherein an input of the switching regulator is connected to an output of the operational amplifier and an output of the switching regulator is fed back to a first input of the operational amplifier. The operational amplifier regulates the switching regulator such that the switching regulator provides at its output an output measuring signal for a load that corresponds to the input measuring signal.

8 Claims, 3 Drawing Sheets

(51) Int. Cl.
*G01D 3/08* (2006.01)
*G01D 21/00* (2006.01)
*G05F 1/56* (2006.01)
*H02M 3/335* (2006.01)
*H02M 1/00* (2006.01)

(52) U.S. Cl.
CPC ...... *H02M 3/335* (2013.01); *H02M 2001/007* (2013.01); *H02M 2001/0045* (2013.01)

(58) Field of Classification Search
USPC .......................................... 323/272–285, 315
See application file for complete search history.

(56) References Cited

U.S. PATENT DOCUMENTS

| | | | |
|---|---|---|---|
| 5,867,048 A | 2/1999 | Chou | |
| 6,297,621 B1 * | 10/2001 | Hui | H02M 1/4225 323/222 |
| 6,768,228 B1 * | 7/2004 | Fial | H02H 5/12 307/131 |
| 7,245,512 B2 * | 7/2007 | Leung | H02M 3/33561 323/283 |
| 7,397,678 B2 * | 7/2008 | Frank | H02M 1/4225 323/207 |
| 2005/0088159 A1 | 4/2005 | Itohara | |
| 2005/0162223 A1 | 7/2005 | Maejima | |
| 2006/0013026 A1 | 1/2006 | Frank et al. | |
| 2012/0139507 A1 | 6/2012 | Ferguson | |
| 2012/0169240 A1 * | 7/2012 | Macfarlane | H02M 1/4225 315/152 |
| 2013/0325380 A1 * | 12/2013 | Behnke, II | A61B 18/1233 702/64 |
| 2014/0062441 A1 * | 3/2014 | Butler | H03F 1/52 323/282 |

FOREIGN PATENT DOCUMENTS

| | | |
|---|---|---|
| CN | 103314398 A | 9/2013 |
| DE | 3934007 C2 | 10/1990 |
| DE | 10217447 B4 | 11/2003 |
| DE | 102007006503 A1 | 8/2008 |
| DE | 102010061433 A1 | 6/2012 |
| DE | 102012111285 B3 | 2/2014 |
| JP | 2005-086992 A | 3/2005 |
| KR | 20110077678 A | 7/2011 |
| WO | 2008007308 A1 | 1/2008 |

OTHER PUBLICATIONS

Authorized Officer: Millie Condron, "International Search Report and Written Opinion" issued in counterpart International Patent Application No. PCT/EP2015/051216, dated Apr. 1, 2015, Publisher: PCT.

Authorized Officer: Christian Kallinger, "International Search Report" issued in counterpart International Patent Application No. PCT/EP2015/051216, dated Mar. 19, 2015, Publisher: PCT.

"Written Opinion of the Search Authority" issued in counterpart International Patent Application No. PCT/EP2015/051216, dated Apr. 1, 2015, Publisher: PCT.

Authorized Officer: Nora Lindner, English Translation of the "International Preliminary Report on atentability" issued in counterpart PCT Application No. PCT/EP2015/051216, dated Aug. 4, 2016, Publisher: PCT.

"Office Action", issued in counterpart CN App. No. 201580005546.9, dated Apr. 3, 2018.

* cited by examiner

SIGNAL ISOLATOR

FIELD OF THE INVENTION

The invention relates to a signal isolator comprising an input stage which is adapted to supply an input measuring signal that corresponds to a measuring signal to an output circuit connected downstream of the input stage. The output circuit includes a linear regulator and is adapted to provide at its output an output measuring signal that corresponds to the input measuring signal.

BACKGROUND OF THE INVENTION

Signal isolators for input measuring currents of, e.g., 0 or 4 mA up to 20 mA or for input measuring voltages of, e.g., 0 to 1 volt are known.

A signal isolator whose power loss is to be reduced is known from DE 10 2007 006 503 A1. This signal isolator has an input for a measuring current. The input is connected to a downstream DC transformer with isolated potential which transmits the measuring current to an output circuit. The output circuit comprises a linear regulator which includes an operational amplifier and an output transistor and functions as a voltage-to-current converter. The output circuit of the linear regulator includes the output terminals of the signal isolator to which a load can be connected. The output circuit further comprises a switching regulator that is arranged between the output terminals. Switching regulator and linear regulator are implemented as separate functional units. The switching regulator receives, from the linear regulator, a control signal which regulates the switching regulator such that the output voltage of the linear regulator is minimized.

Also, a signal isolator is known from DE 10 2010 061 433 A1, which comprises, as an input stage, an inverter, a transformer, and a rectifier, via which an input measuring current is supplied to a linear regulator. The linear regulator comprises an operational amplifier and an output transistor to which a load can be connected. To reduce the power loss of the output transistor, the conventional signal isolator has a control device implemented as a switching power supply which controls an auxiliary voltage in a manner so that the power loss of the output transistor of the linear regulator is substantially independent of a load connected in the operating state. Linear regulator and switching power supply are separate functional units.

The invention is based on the object to provide a signal isolator with circuitry of significantly reduced complexity compared to the known signal isolators, so that the power loss of a signal output stage of the signal isolator can be further reduced.

SUMMARY OF THE INVENTION

A key idea of the invention can be seen in the fact that a switching regulator is directly integrated in a linear regulator. As a result, the output transistor of a linear regulator can be omitted, so that the power loss of the signal isolator is reduced at least by the portion the output transistor would require.

Another aspect of the invention can be seen in the fact that the operational amplifier of a linear regulator no longer controls an output transistor of the linear regulator, as usual, but rather directly controls the switching regulator.

Another aspect of the invention can be seen in the fact that the output of the switching regulator directly supplies an analog output measuring signal.

The technical problem mentioned above is solved by the illustrative embodiment of the present invention.

Accordingly, a signal isolator is provided which comprises an input stage that is adapted to provide an input measuring signal corresponding to a measuring signal to an output circuit connected downstream of the input stage. The output circuit comprises a linear regulator and is adapted to provide at its output an output measuring signal corresponding to the input measuring signal. The linear regulator comprises an operational amplifier and a switching regulator. An input of the switching regulator is connected to an output of the operational amplifier, while an output of the switching regulator is fed back to a first input of the operational amplifier. The operational amplifier controls the switching regulator such that the switching regulator provides at its output an output measuring signal for a load that corresponds to the input measuring signal.

It should be noted that the measuring signals may be analog measuring currents, for example in a range from 0 to 20 mA or from 4 to 20 mA, or analog measuring voltages, for example in a range from 0 to 1 volt. The input stage may comprise an inverter implemented in form of a chopper in a per se known manner, a transformer, and a rectifier connected downstream of the transformer.

According to an advantageous embodiment, the output of the switching regulator is connected to the first input of the operational amplifier via a feedback network, for example a passive resistor network. In this manner, the operational amplifier regulates the switching regulator such that the switching regulator provides at its output an output measuring signal for a load that corresponds to the input measuring signal in a predetermined manner. Predetermined manner herein means that the output measuring signal corresponds to the input measuring signal multiplied with a defined gain.

The feature that the measuring signal corresponds to the input measuring signal therefore includes cases in which the magnitude of the output measuring signal corresponds exactly or substantially to the magnitude of the input measuring signal or corresponds to the magnitude of the input signal modified by a factor that is defined by the feedback network.

Advantageously, the linear regulator is implemented as a converter of a group comprising current-to-current converter, voltage-to-voltage converter, current-to-voltage converter, and voltage-to-current converter.

The switching regulator may, for example, be a step-down converter, also known as buck converter, a step-up or boost converter, a flyback converter, or a single-ended primary-inductor converter (SEPIC).

BRIEF DESCRIPTION OF THE DRAWINGS

The invention will now be described in more detail by way of two exemplary embodiments in conjunction with the accompanying drawings, wherein.

DETAILED DESCRIPTION

Figure 1:
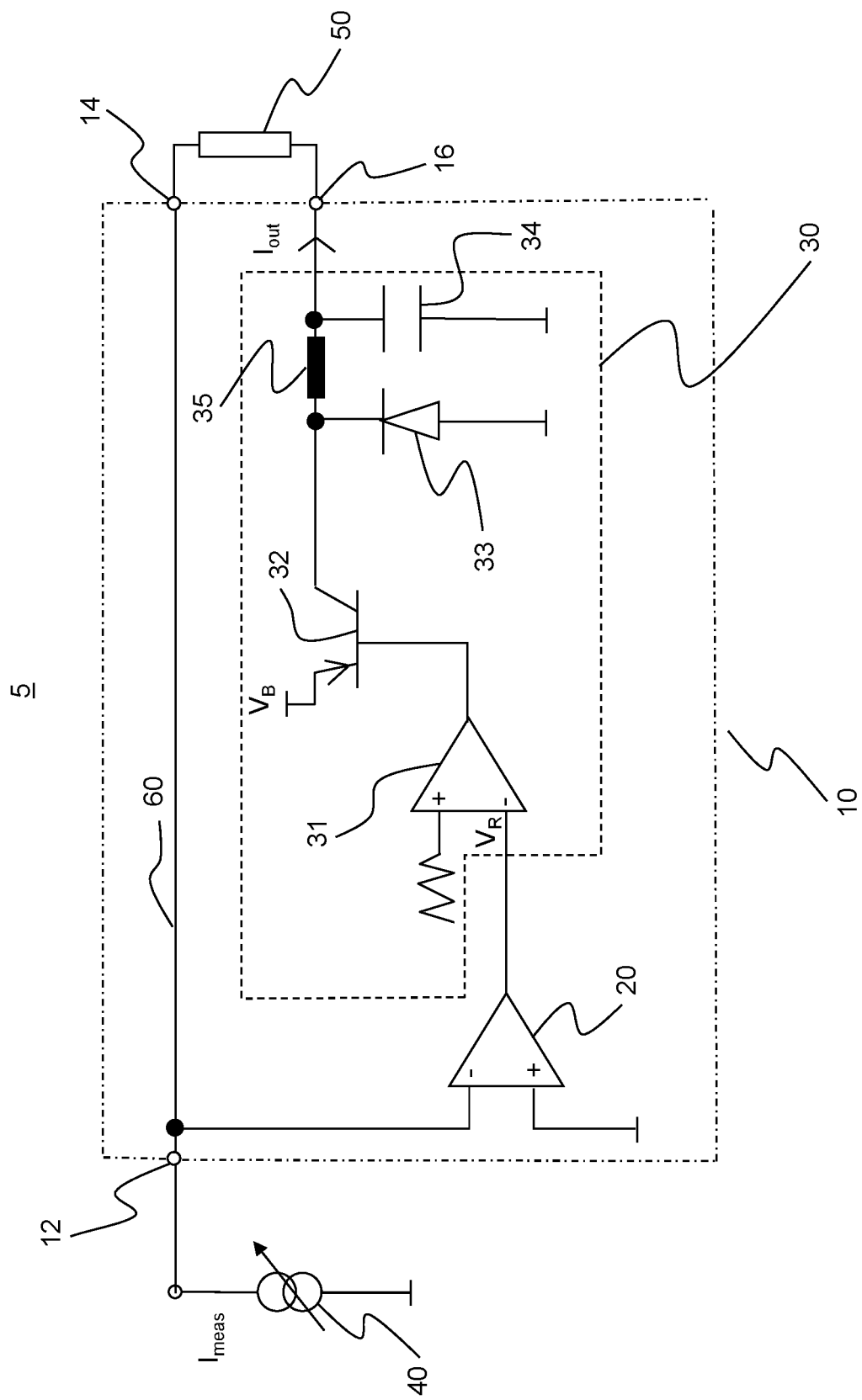
FIG. 1 shows an exemplary signal isolator comprising an output circuit in which the invention is implemented.
Figure 3:
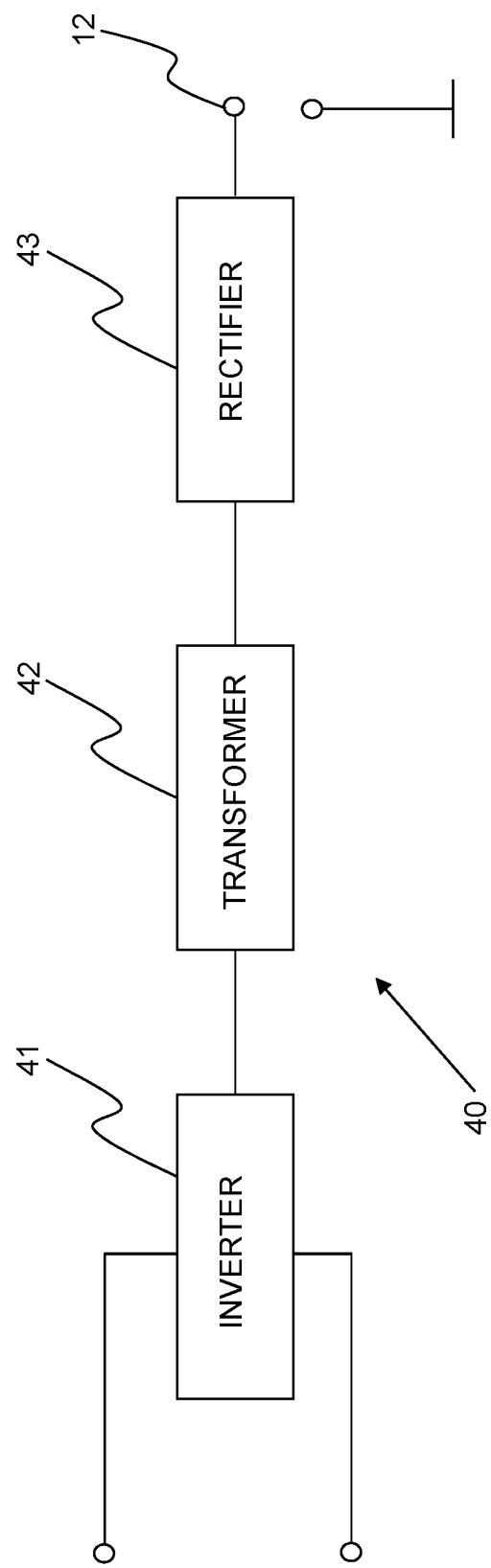
FIG. 3 is a detailed block diagram of the input stages symbolically illustrated in FIG. 1 and FIG. 2.

FIG. 1 illustrates an exemplary signal isolator. The signal isolator comprises an input stage 40 which is represented by the symbol of a controlled current source. Input stage 40 may provide an analog measuring input current $I_{meas}$ as an input measuring signal with a magnitude of, for example, 0 to 20 mA or 4 mA to 20 mA corresponding to a measuring signal applied to the input of input stage 40. The input stage 40 may comprise an inverter 41 implemented in form of a chopper in a per se known manner, which converts an analog constant measuring signal into an AC signal which is then transmitted via a transformer 42 and is re-rectified in a rectifier 43 connected downstream of the transformer 42 and provided as an input measuring signal. This exemplary input stage 40 is shown in FIG. 3.

It should be noted that the current of the controlled current source indicated by $I_{meas}$ in FIG. 1 corresponds to the input measuring current which is provided by input stage 40 at an input 12 of an output circuit 5. Output circuit 5, for example, only comprises a linear regulator 10, which functions as a current-to-current converter in the illustrated exemplary embodiment. Linear regulator 10 may as well be implemented as a voltage-to-current converter, for example.

At the input side, linear regulator 10 includes an operational amplifier 20 which has a negative input connected to the input 12 of output circuit 5. The positive input of operational amplifier 20 is connected to ground. The output of operational amplifier 20 is directly connected to a switching regulator 30 which is an integral part of linear regulator 10.

Switching regulator 30 is implemented as a buck or step-down converter, by way of example. It includes a comparator 31, for example, which has a negative input connected to the output of operational amplifier 20. The output of operational amplifier 20 thus directly provides a control voltage VR for switching regulator 30. A triangular or sawtooth voltage is applied to the positive input of comparator 31, for example. In a per se known manner, comparator 31 supplies a square-wave control signal to the base terminal of a transistor 32 connected downstream thereof, to perform a pulse width modulation in a per se known manner. An operating voltage VB is applied to the emitter terminal of transistor 32. The collector of transistor 32 may be connected to an output terminal 16 of output circuit 5 via a pi circuit that comprises a diode 33, a coil 35, and a smoothing capacitor 34. Accordingly, the switching regulator 30 of linear regulator 10 directly provides an output measuring signal for a connected load 50. In the embodiment shown, the output measuring signal is an analog output measuring current $I_{out}$ corresponding to an input measuring current provided at input 12. Linear regulator 10 or output circuit 5 has a second output terminal 14. Load 50 may thus be connected to output terminals 14 and 16. The output measuring current $I_{out}$ of switching regulator 30 supplied to output 16 is fed back to the negative input of operational amplifier 20 via load 50 and output terminal 14 through a feedback path 60.

The operation of linear regulator 10 shown in FIG. 1 will be explained below.

Operational amplifier 20 provides a control voltage VR to the negative input of comparator 31, which ensures that the transistor 32 is driven so that the switching regulator 30 provides an output measuring current $I_{out}$ at output terminal 16, which when fed back to the negative input of operational amplifier 20 via load 50 has the effect that the negative input of operational amplifier 20 is at a potential of 0 V, so that a virtual short circuit is generated between the two inputs of the operational amplifier. In other words, the operational amplifier 20 regulates the switching regulator 30 such that the switching regulator 30 provides an output measuring current $I_{out}$ for the load 50 at output terminal 16, which exactly or at least substantially corresponds to the input measuring current $I_{meas}$. The output measuring current is in a range from 0 or 4 mA to 20 mA when the input measuring current is in a range from 0 or 4 to 20 mA.

Figure 2:
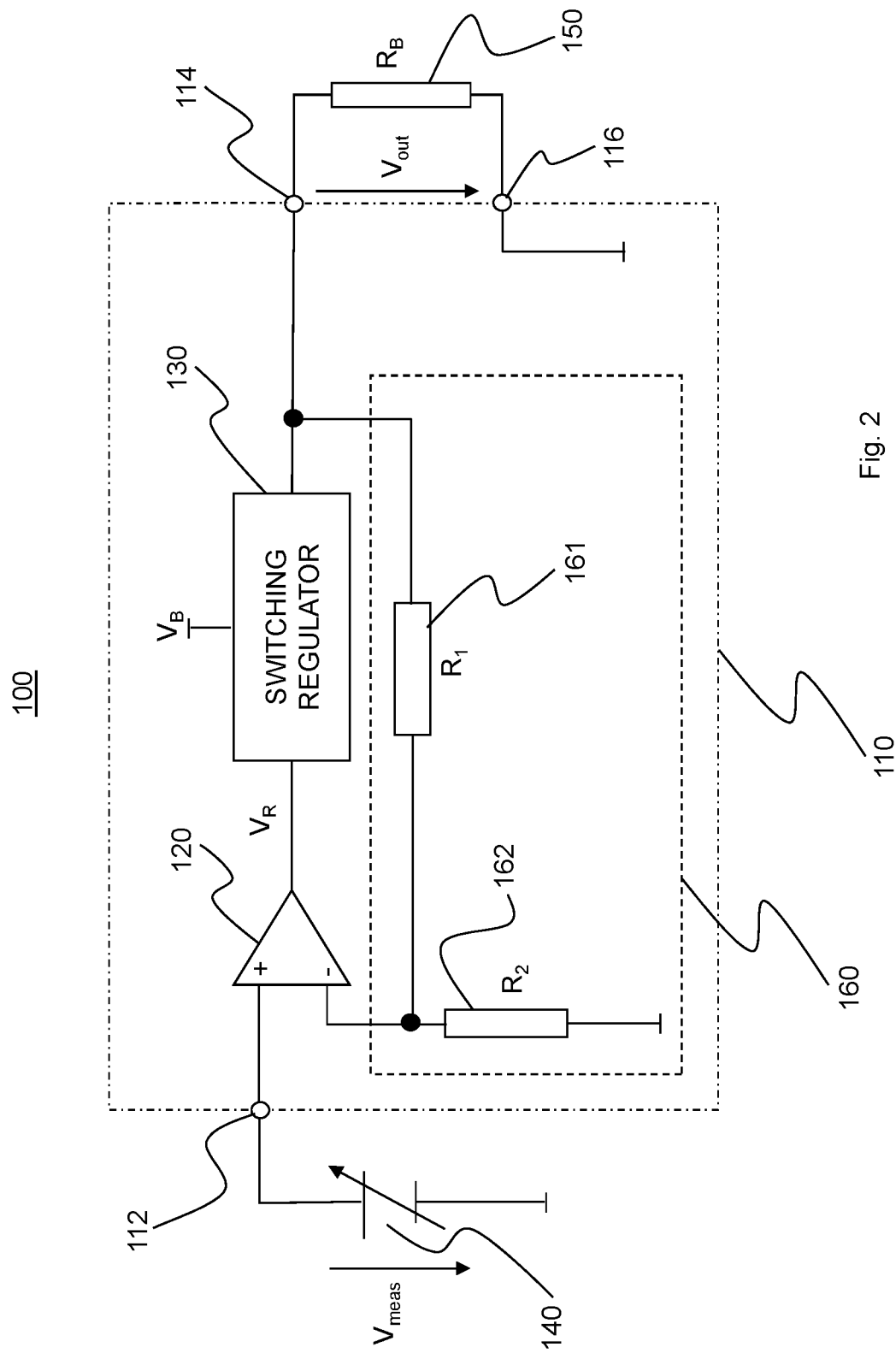
FIG. 2 shows an exemplary signal isolator comprising an alternative output circuit in which the invention is implemented.

FIG. 2 shows an alternative exemplary signal isolator. The signal isolator comprises an input stage 140 which is symbolically represented as a controlled voltage source. Input stage 140 is capable of providing an analog input measuring voltage $V_{meas}$ as an input measuring signal, with a magnitude of, for example, 0 to 1 V corresponding to a measuring signal applied to the input of input stage 140. Input stage 140 may comprise an inverter implemented in form of a chopper in a per se known manner, which converts an analog measuring signal into an AC signal which is then transmitted via a transformer and is re-rectified in a rectifier connected downstream of the transformer and provided as an input measuring signal. This exemplary input stage 140 may correspond to the input stage 40 as shown in FIG. 3.

It should be noted that the voltage of the controlled voltage source indicated by $V_{meas}$ in FIG. 2 corresponds to the input measuring voltage which is provided at an input 112 of an output circuit 100 by input stage 140. Output circuit 100, for example, only comprises a linear regulator 110 which functions as a voltage-to-voltage converter in the illustrated exemplary embodiment. Linear regulator 110 may as well be implemented as a current-to-voltage converter, for example.

At the input side, linear regulator 110 includes an operational amplifier 120 which has a positive input connected to the input 112 of output circuit 100. Consequently, the positive input of operational amplifier 120 is connected to the input stage 140. The negative input of operational amplifier 120 is connected to ground, via a resistor $R_2$ designated by 162. The output of operational amplifier 120 is directly connected to a switching regulator 130 which is an integral part of linear regulator 110. The output of operational amplifier 120 thus directly provides a control voltage $V_R$ for switching regulator 130. Switching regulator 130 and operational amplifier 120 may be powered by an operating voltage source which provides an operating voltage $V_B$.

Resistor 162 is part of a feedback network 160 which comprises a further resistor designated by 161. Resistors 161 and 162 define a voltage divider, and the common connection point of resistors 161 and 162 is connected to the negative input of operational amplifier 120. The free terminal of resistor 161 is connected to the output of switching regulator 130. In this way, a constant output measuring voltage present at the output of switching regulator 130 is fed back to the negative input of operational amplifier 120 via feedback network 160. The output of switching regulator 130 which directly provides an output measuring voltage $V_{out}$ of the output circuit 100 is connected to an output terminal 114 of output circuit 100, or linear regulator 110 respectively. A second output terminal 116 is connected to ground, for example. A load 150 may be connected to output terminals 114 and 116, at which the output voltage $V_{out}$ is applied.

It should be noted here that the switching regulator 130 may for example be the step-down converter shown in FIG. 1. Switching regulator 130 could as well be a step-up converter, a flyback converter, or a SEPIC converter, for example.

The operation of linear regulator 110 shown in FIG. 2 will be explained below.

Operational amplifier 120 supplies a control voltage $V_R$ to the input of switching regulator 130, which ensures that switching regulator 130 provides an output potential at output terminal 114, which when fed back via the feedback network 160 to the negative input of operational amplifier 20 has the effect that the negative input of operational amplifier 120 will be at a potential which corresponds to the potential provided by input stage 140 at input 112. In other words, the operational amplifier 120 controls the switching regulator 130 in a manner so that the switching regulator 130 provides, at output terminals 114 and 116, an output measuring voltage $V_{out}$ for the load 150, which corresponds to the input measuring voltage $V_{meas}$ multiplied by the gain $(1+R_1/R_2)$ of the controlled voltage source. It is assumed that the resistors are dimensioned so that, for example, the values of the output measuring voltage are between 0 and 10 V when the controlled voltage source provides an input measuring voltage in a range between 0 and 1 V.

Due to the measure of integrating the switching regulator directly into the linear regulator, the usually existing output transistor of the linear regulator is eliminated so that the power loss of the signal isolation circuit is reduced at least by the portion that the output transistor would require.

Furthermore, this measure allows the operational amplifier of the linear regulator to directly control the switching regulator, whose output then directly supplies an analog output measuring signal which corresponds to an input measuring signal provided by the input stage.

What is claimed is:

1. A signal isolator, comprising:
    an input stage adapted to provide an input measuring signal corresponding to a measuring signal to an output circuit connected downstream of the input stage;
    wherein the output circuit comprises a linear regulator and is adapted to provide at its output an output measuring signal corresponding to the input measuring signal;
    wherein the linear regulator comprises an operational amplifier and a switching regulator;
    wherein an input of the switching regulator is connected to an output of the operational amplifier and an output of the switching regulator is fed back to a first input of the operational amplifier;
    wherein a load directly feeds back the output of the switching regulator to the first input of the operational amplifier, wherein the load is directly connected to the first input of the operational amplifier; and
    wherein the operational amplifier regulates the switching regulator such that the switching regulator provides at its output an output measuring signal for the load that corresponds to the input measuring signal.

2. The signal isolator as claimed in claim 1, wherein the linear regulator is implemented as a current-to-current or voltage-to-current converter.

3. The signal isolator as claimed in claim 1, wherein the linear regulator is implemented as a current-to-voltage or voltage-to-voltage converter.

4. The signal isolator as claimed in claim 1, wherein the switching regulator is implemented as one of a step-down converter, step-up converter, flyback converter, or single-ended primary-inductor converter.

5. A signal isolator, comprising:
    an input stage adapted to provide an input measuring signal corresponding to a measuring signal to an output circuit connected downstream of the input stage;
    wherein the output circuit comprises a linear regulator and is adapted to provide at its output an output measuring signal corresponding to the input measuring signal;
    wherein the linear regulator comprises an operational amplifier and a switching regulator;
    wherein an input of the switching regulator is connected to an output of the operational amplifier and an output of the switching regulator is fed back to a first input of the operational amplifier;
    wherein the operational amplifier regulates the switching regulator such that the switching regulator provides at its output an output measuring signal for a load that corresponds to the input measuring signal; and
    wherein a feedback network connects the output of the switching regulator to the first input of the operational amplifier.

6. The signal isolator as claimed in claim 5, wherein the linear regulator is implemented as a current-to-current or voltage-to-current converter.

7. The signal isolator as claimed in claim 5, wherein the linear regulator is implemented as a current-to-voltage or voltage-to-voltage converter.

8. The signal isolator as claimed in claim 5, wherein the switching regulator is implemented as one of a step-down converter, step-up converter, flyback converter, or single-ended primary-inductor converter.

* * * * *